Figure 1:
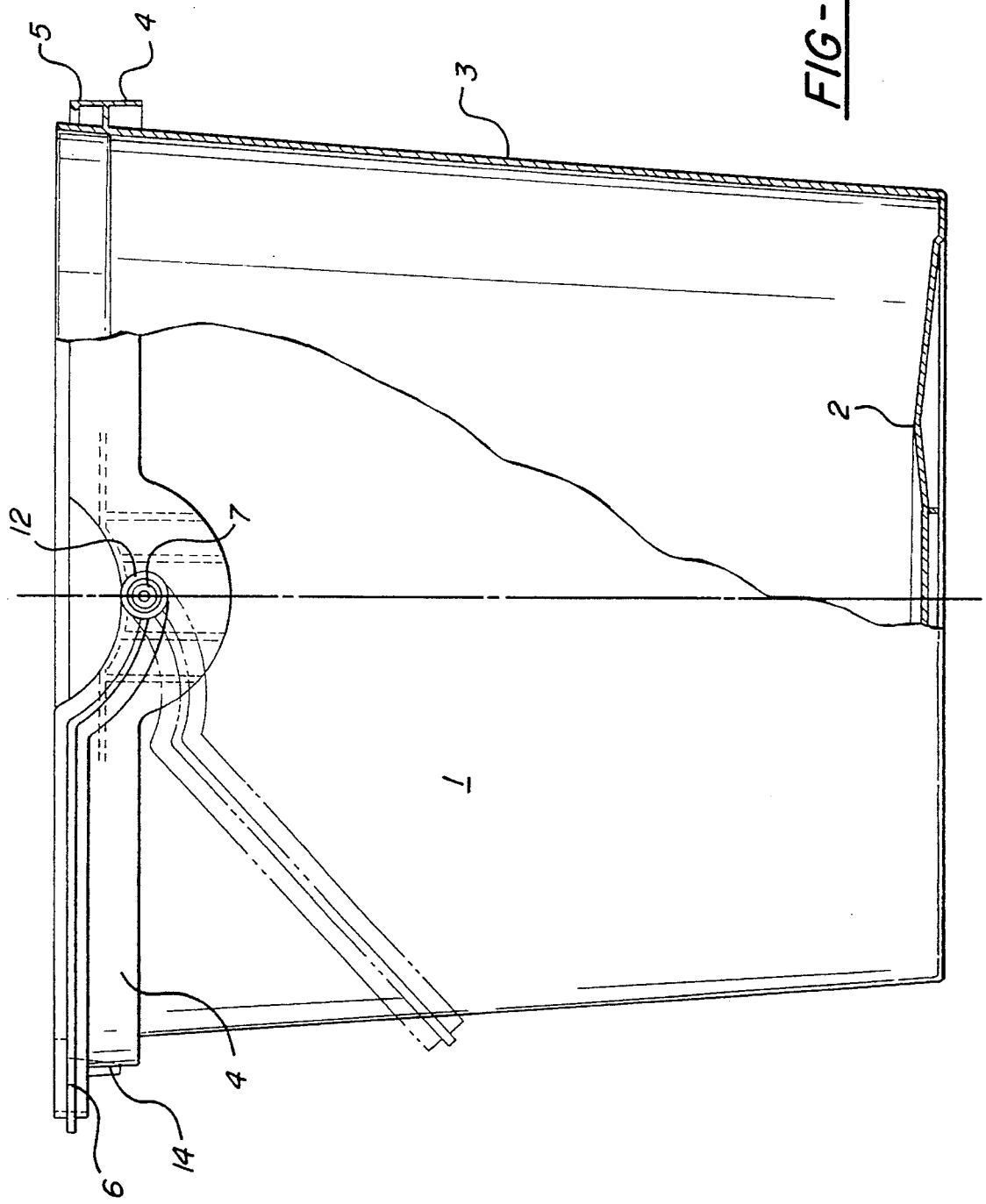

United States Patent [19]
Georgiadis

[11] Patent Number: 5,526,954
[45] Date of Patent: Jun. 18, 1996

[54] INJECTION MOLDED PLASTIC BUCKET WITH AN INTEGRALLY MOULDED CARRY HANDLE

[75] Inventor: Robert G. Georgiadis, Bergisch Gladbach, Germany

[73] Assignee: Jokey Plastik Wipperfurth GmbH, Wipperfurth, Germany

[21] Appl. No.: 403,788

[22] PCT Filed: Sep. 6, 1993

[86] PCT No.: PCT/DE93/00816

§ 371 Date: Mar. 15, 1995

§ 102(e) Date: Mar. 15, 1995

[87] PCT Pub. No.: WO94/06694

PCT Pub. Date: Mar. 31, 1994

[30] Foreign Application Priority Data

Sep. 15, 1992 [DE] Germany .......................... 42 30 788.0

[51] Int. Cl.$^6$ ................................................. B65D 25/32
[52] U.S. Cl. ......................... 220/760; 220/268; 220/756; 220/763; 220/771
[58] Field of Search ................................... 220/756, 757, 220/759, 760, 762, 763, 764, 765, 769, 771, 773, DIG. 14, DIG. 12, 266, 268, 269; 16/126

[56] References Cited

U.S. PATENT DOCUMENTS

| | | | |
|---|---|---|---|
| 2,895,522 | 7/1959 | Bloch | 220/762 |
| 3,861,840 | 1/1975 | Heisler . | |
| 3,889,732 | 6/1975 | Wilkins | 220/763 |
| 4,125,246 | 11/1978 | Von Holdt . | |
| 4,172,577 | 10/1979 | Von Holdt . | |
| 4,476,083 | 10/1984 | Von Holdt . | |
| 4,632,357 | 12/1986 | Von Holdt . | |
| 4,998,622 | 3/1991 | Drack | 220/773 |
| 5,027,973 | 7/1991 | Drogos | 220/763 |

FOREIGN PATENT DOCUMENTS 2135957  9/1984  United Kingdom .................. 220/762

Primary Examiner—Stephen J. Castellano
Attorney, Agent, or Firm—C. J. Fildes & Co.

[57] ABSTRACT

The invention, which relates to an injection-molded plastic bucket with a bottom, a wall expanding conically from there to the upper edge and a carrying handle, where the upper edge of the wall is provided with receiving elements for a carrying handle at diametrically opposite points, and a process for manufacturing an injection-molded plastic bucket, is based on the task of specifying a plastic bucket and a process for its manufacture, of which the technical outlay and, thus, the mold costs can be reduced and of which the universal utility of the molds can be improved, this task being solved in that the plastic bucket is molded in one piece, where the carrying handle is located in the parting surface between the hollow mold and the female mold during molding, the carrying handle is at least indirectly connected to the remaining bucket body via ties designed as predetermined breaking points, and pins protruding outwards are integrally molded on the upper edge at the locations of the receiving elements, these pins each being encircled by a carrying handle eye connected to the carrying handle, the ends of the pins being provided with securing elements to prevent the carrying handle eyes slipping off laterally when the ties are broken.

10 Claims, 6 Drawing Sheets

INJECTION MOLDED PLASTIC BUCKET WITH AN INTEGRALLY MOULDED CARRY HANDLE

The invention relates to an injection-moulded plastic bucket with a bottom, a wall expanding conically from there to the upper edge, and with a carrying handle, where the upper edge of the wall is provided with receiving elements for a carrying handle at diametrically opposite points, consisting of outward-projecting pins, integrally moulded on the upper edge, the ends of the pins being provided with securing elements to prevent the carrying handle eyes from slipping off laterally and each being encircled by a carrying handle eye connected to the carrying handle.

Plastic buckets of the type mentioned above are generally manufactured by mass production. If the carrying handles are manufactured separately from the buckets, their attachment necessitates a substantial outlay, as this requires an additional handle-fitting operation which involves additional automatic handle-fitting machines.

For this reason, attempts are being made to manufacture carrying handle and bucket in a single operation. To this end, unexamined German application 35 40 059 describes a bucket with an articulated bow-type handle which is retained in integrally moulded handle-retaining cages on opposite sides of the bucket by means of knobs on the ends of the handle.

This type permits manufacture of the bucket in one piece, this being achieved by means of a mould comprising not only the mould halves generally familiar in moulds, but also several slides for forming the handle-retaining cages and the handle knobs.

During moulding, two slides are required on each side, these being laterally inserted into the space for the handle retaining cages in order to mould the knobs. In addition, two slides have to be used on each side to mould the undercuts on the handle knobs.

The disadvantage of this known solution is that the slides required for forming the handle-retaining cages and the handle knobs require a major technical effort and result in very high mould costs. Furthermore, it is impossible to refit the mould, for instance in the event that buckets without handles are to be manufactured because a metal handle needs to be used.

A further known solution is disclosed by U.S. Pat. No. 4,125,246, which describes a mould for a plastic bucket which provides for the handle of the plastic bucket to be moulded in the parting surface between female mould and male mould. Outward-projecting pins are integrally moulded on the upper edge at the locations of the receiving elements. The pins are each encircled by a carrying handle eye connected to the carrying handle.

The ends of the pins are provided with securing elements to prevent the carrying handle eyes from slipping off laterally and the pins are hollow on the inside.

In this context, the securing elements are realised in that the pins either have external projections or are conically extended. The shape of the pins necessitates forced demoulding, i.e. the internal cavity is generated by a mandrel-like mould element and the outer contour of the pin by a sleeve-like mould element, the inner form of the sleeve producing the later outer contour of the pin.

The type of bucket known from the U.S. Pat. No. 4,125,246 either requires plastic deformation in order to achieve demoulding, on the one hand, and to realise a securing element on the end of the pin, on the other hand. The fact that this plastic deformation remains necessary means it is necessary to await precisely that moment in time when the compound is still just capable of plastic deformation. This will lead to quality problems in practice, because the disturbance variables affecting this condition are manifold.

Another design necessitates elastic demoulding where plastic deformation is undesirable. This increases the waiting time before demoulding as it is necessary to wait until the state of plastic deformability has been passed with certainty. Furthermore, the forced demoulding step generally requires two motions. Either the inner part, i.e., the mandrel, must be removed first, followed by the outer part, i.e., the sleeve, or vice versa. In any event, two consecutive work steps are necessary. Compliance with the states of deformation and the work steps involved in forced demoulding extends the cycle time, this having a negative effect, particularly on the mass production of buckets of this kind.

The invention is now based on the task of specifying a plastic bucket which, while retaining good carrying properties, makes it possible to reduce the manufacturing outlay by reducing the cycle time and the mould costs.

Pursuant to the invention, the task is solved in that the retaining element is designed as a retaining ring, integrally moulded on the outer end of the pin with at least one tie, and that further ties between carrying handle eye and pin are in line with the ties between retaining ring and pin in the axial direction of the pin directly after manufacture of the plastic bucket and prior to use of the carrying handle.

Designing the plastic bucket in this way achieves a situation where manufacture in one piece is possible because, during injection moulding of the plastic bucket, the plastic material fills not only the cavity of the bucket body, but also the cavities of the pins, and via the cavities for the ties, also the cavity of the carrying handle with its carrying handle eyes.

As the outside contour of the carrying handle and carrying handle eyes can be moulded in the hollow mould and in the female mould, only the outer form of the pin and the separation between the carrying handle eyes need be shaped separately by additional mould elements. However, the shape of the pin ensures that these additional mould elements can be of very simple and inexpensive design.

In this context, the inventive retaining ring has an outside diameter which is larger than the inside diameter of the carrying handle eye. It thus prevents the carrying handle eye from slipping laterally off the pins once the carrying handle has been used and the ties have thus been broken. As this retaining ring is only connected to the pin via two ties, it does not obstruct an additional pin-forming mould element, thus allowing it to retain its simple design.

In a favourable design of the invention, it is envisaged that each pin is encircled by a carrying handle eye connected to the carrying handle, said eyes being connected to the pin via at least one tie designed as a predetermined breaking point.

In principle, the fixation of the carrying handle prior to separation of the ties can also be used as an original seal. If the bucket is designed in such a way that a lid sealing the upper side can only be opened after tearing the carrying handle off its ties, the contents of the bucket cannot be changed without an externally visible sign—the broken ties in this case. This guarantees the original nature of the bucket contents when the carrying handle is fixed.

Furthermore, it is also favourable to design the carrying handle in such a way that it is connected directly to the upper edge via at least one tie designed as a predetermined breaking point.

Thus, additional ties are created which, on the one hand, facilitate the filling of the carrying handle cavity during injection moulding, as injection moulding material can penetrate the cavity at several points, and, on the other hand, favour the fixing of the carrying handle prior to use.

According to a further design of the inventive solution, it is provided that the carrying handle is designed as an original seal in such a way that it permits an opening of a lid sealing the upper side only through ties to be broken. Thus, it becomes visible to everyone, when, for example, the plastic bucket filled is not in its original state when being sold.

According to a further favourable design of the invention it is provided that in the area of the edge in which the carrying handle is connected to the edge via the ties, a tab is designed as part of the edge, extending outward by a small amount, being separated from the rest of the edge and only connected to the edge via ties designed as predetermined breaking points.

Thus, it is achieved that in order to gain access to the contents of the plastic bucket according to the invention it is necessary to tear the carrying handle from its ties in order to gain access to the tab 14 and to remove it by breaking its ties. Thus, a possible unauthorized use becomes visible to everyone.

The invention is described in more detail below on the basis of a practical example. The associated drawings show the following FIG. 1 a side view of a plastic bucket in accordance with the invention, including a partial cross-section, FIG. 2 an enlarged detail drawing of a pin, FIG. 3 a top view of a plastic bucket in accordance with the invention, FIG. 4 a section through a bucket in accordance with the invention along line IV—IV in FIG. 3, FIG. 5 an enlarged partial illustration of the section along line V—V in FIG. 3, FIG. 6 an enlarged partial view of the plastic bucket in accordance with the invention with an original seal, FIG. 7 an enlarged partial illustration of a section along line VII—VII in FIG. 3, FIG. 8 a partial section through the pin arrangement of a different form of a plastic bucket in accordance with the invention, FIG. 9 a front view of a pin with conically extended pin end, FIG. 10 a section through a pin pursuant to FIG. 9 along line X—X, and FIG. 11 a section through a pin pursuant to FIG. 9 prior to removal from the mould.

As can be seen from FIG. 1, the plastic bucket 1 has an essentially cylindrical basic shape, displaying a bottom 2 and a wall 3 expanding slightly in conical fashion towards the top. On the upper side of the wall, the plastic bucket is provided with an edge 4, which is connected to the wall 3 and has the function of affording stability and absorbing forces.

The cross-section of this edge 4 constitutes a T-profile. The upward-pointing limb of the T-profile is partially fitted with a snap-fitting projection 5 pointing towards the wall, into which a lid not shown in detail can engage with a lid edge reaching into the space between edge 4 and wall 3.

The edge 4 is provided with receiving elements for a carrying handle 6 at diametrically opposite points.

The edge 4 is extended downwards in the area of these receiving elements in order to guarantee that several identical plastic buckets can be stacked without jamming.

Figure 2:
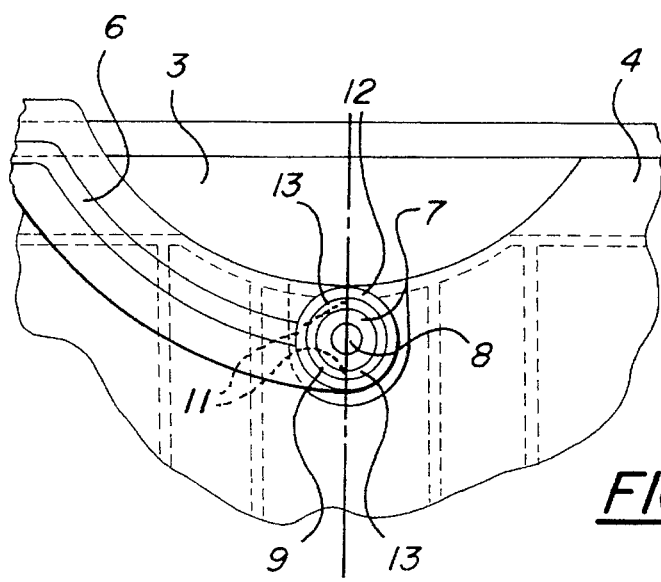
Figure 3:
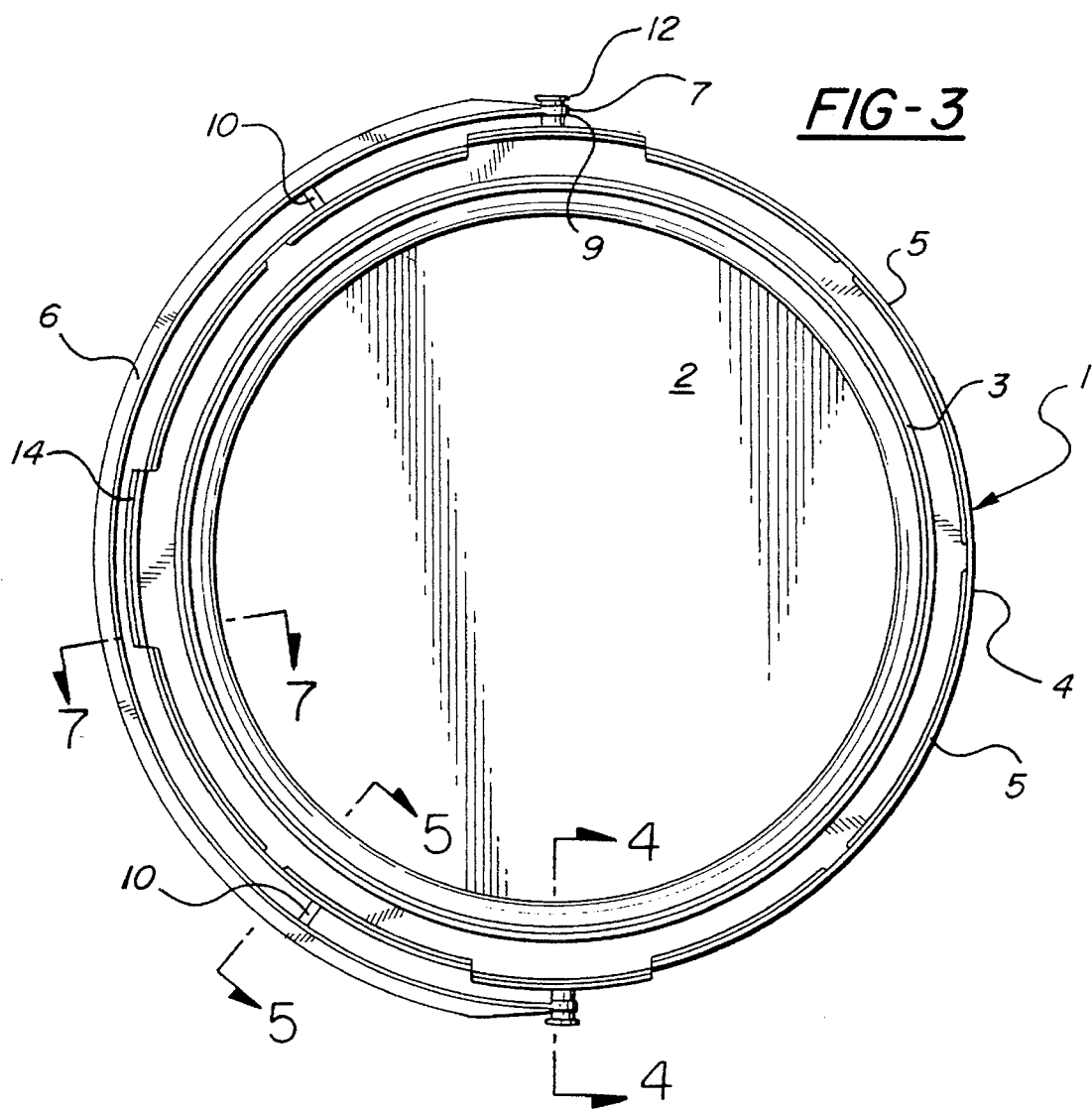

As can be seen from FIG. 2 and FIG. 3, in particular, the receiving elements are designed as pins 7, which have a cylindrical cavity 8 on the inside.

The pins 7 are surrounded by carrying handle eyes 9, which are integrally moulded on the ends of the carrying handle 6.

Partly for the purposes of the material flow during the injection moulding operation and partly in order to fix the carrying handle 6 before its use, the carrying handle 6 is connected to the edge 4 of the plastic bucket 1, directly via ties 10 and indirectly by ties 11 via the carrying handle eyes 9 and the pins 7.

The ties 10 and 11 are designed as predetermined breaking points which can be severed when using the carrying handle 9.

Figure 4:
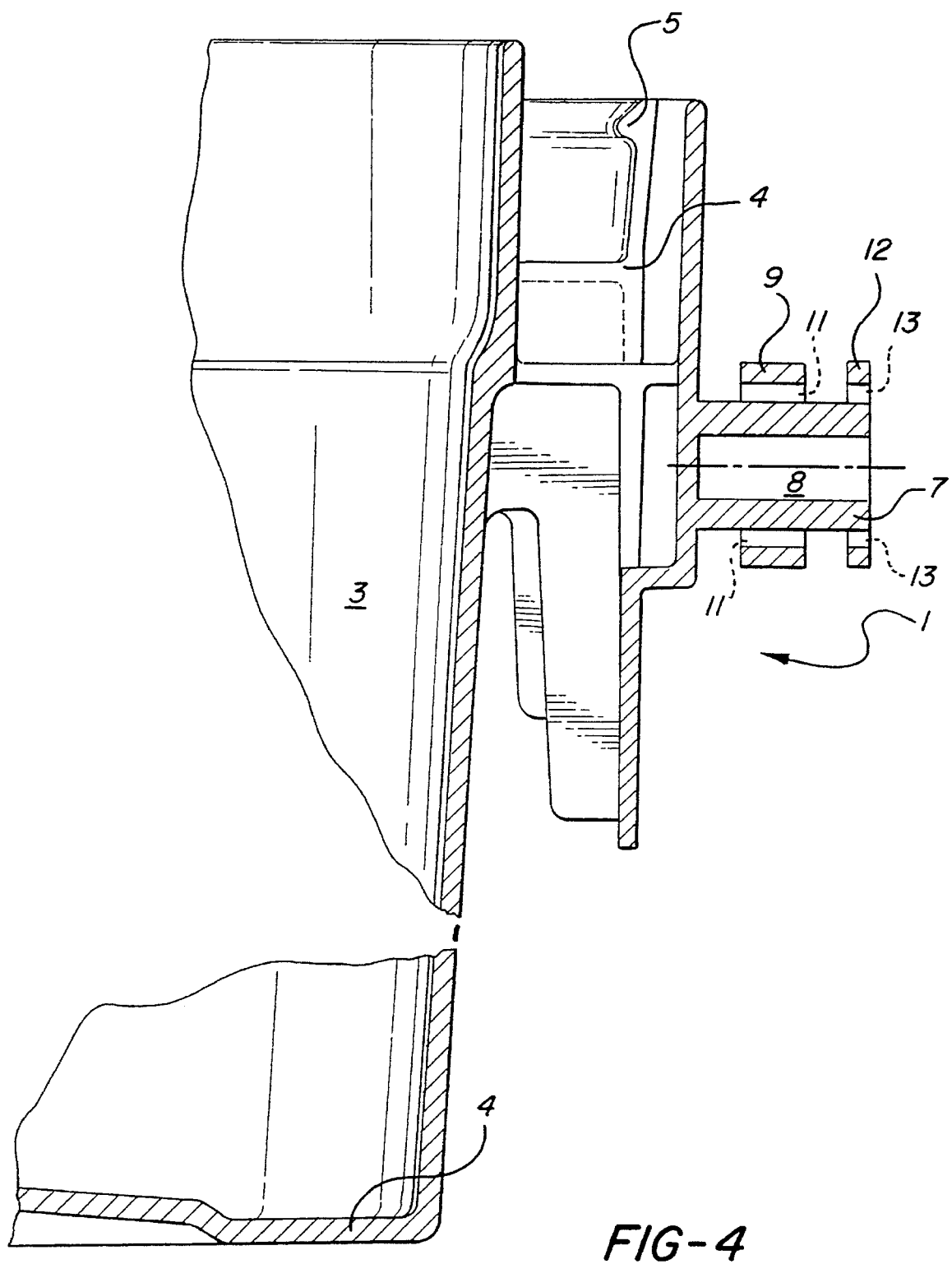

As can be seen from FIG. 4, in particular, the pin 7, which is designed to prevent the carrying handle eyes from slipping laterally from the pins 7 when the carrying handle 6 is used after severing the ties 10 and 11, is fitted with a retaining ring 12 which is connected to the pin via two stable ties 13.

Figure 5:
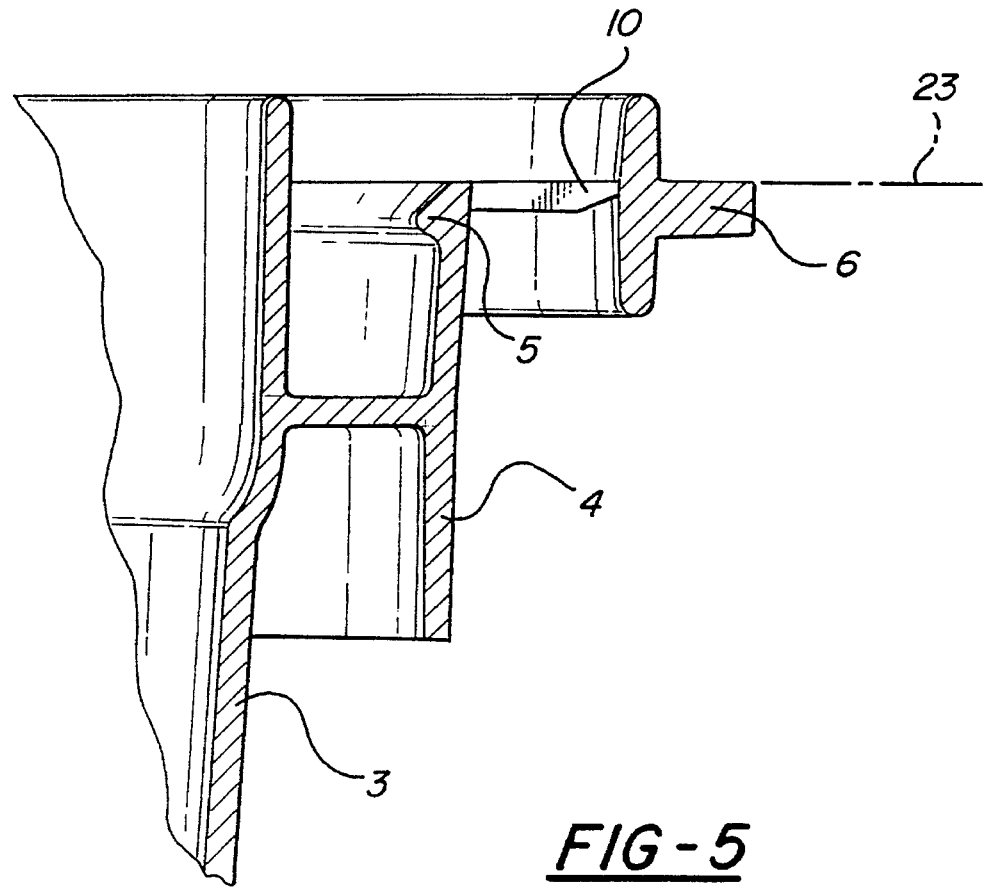

It can be seen from FIG. 5 that the carrying handle 6 has a T-shaped cross-section for the most part in order to increase the stability, the flat side of the T-profile constituting the handle surface in order to improve the carrying properties.

As a plastic bucket 1 in accordance with the invention usually also serves as sales packaging when used for the first time, the buyer generally wants to be able to see whether the contents of the plastic bucket may have undergone any change before purchase which was not performed by the manufacturer. This is the purpose of so-called original seals. In most cases, these have to be irreversibly removed in order to gain access to the contents of the sales packaging.

Figure 6:
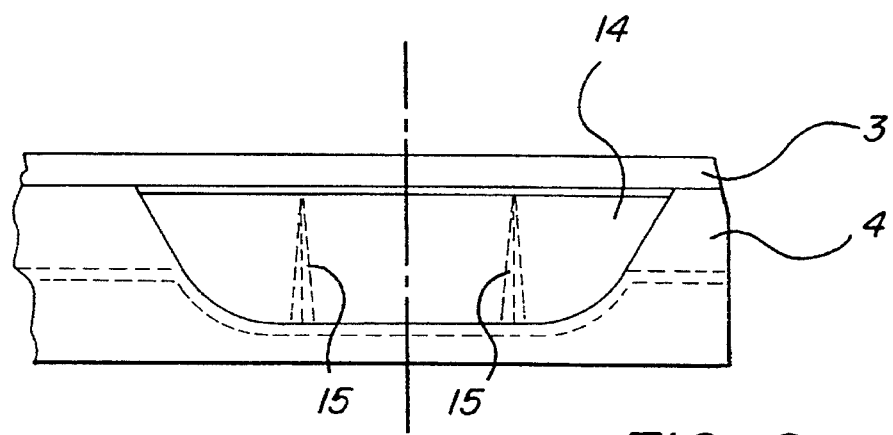
Figure 7:
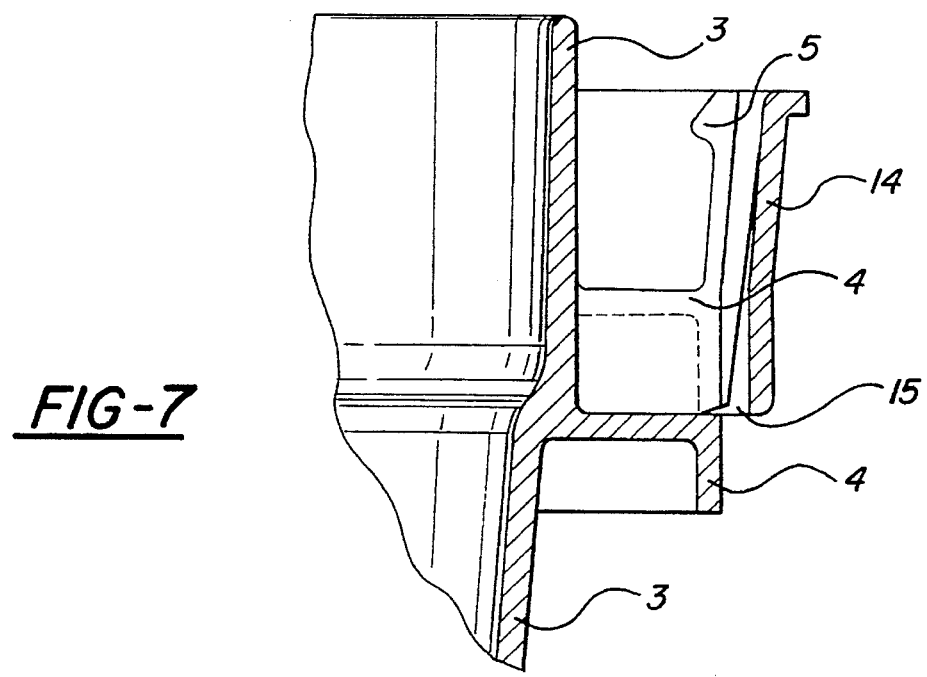

FIGS. 6 and 7 illustrate an original seal of this kind, as has been realised on the plastic bucket in accordance with the invention.

In the area of the edge 4 in which the carrying handle 9 is connected to the edge 4 via the ties 10, a tab 14 is extended outwards by a small amount as part of the edge 4, said tab being separate from the rest of the edge and only connected to the edge 4 via ties 15. Again, the ties 15 are designed as predetermined breaking points.

As the lid reaches between wall 3 and edge 4 with an edge, as previously described, and is otherwise of smooth design, this lid cannot be removed without there being a possibility for reaching under the edge of the lid from below and lifting it off over the snap-fitting projections 5.

In order to gain access to the contents of the plastic bucket in accordance with the invention, it is now necessary first to tear the carrying handle 6 from its ties 10 and 11. This makes it possible to gain access to the tab 14 and to remove it by breaking its ties 15. Only then is there any possibility of reaching under the lid not shown and lifting it off.

In this case, both the carrying handle 6 and the tab 14 serve as original seals.

Figure 8:
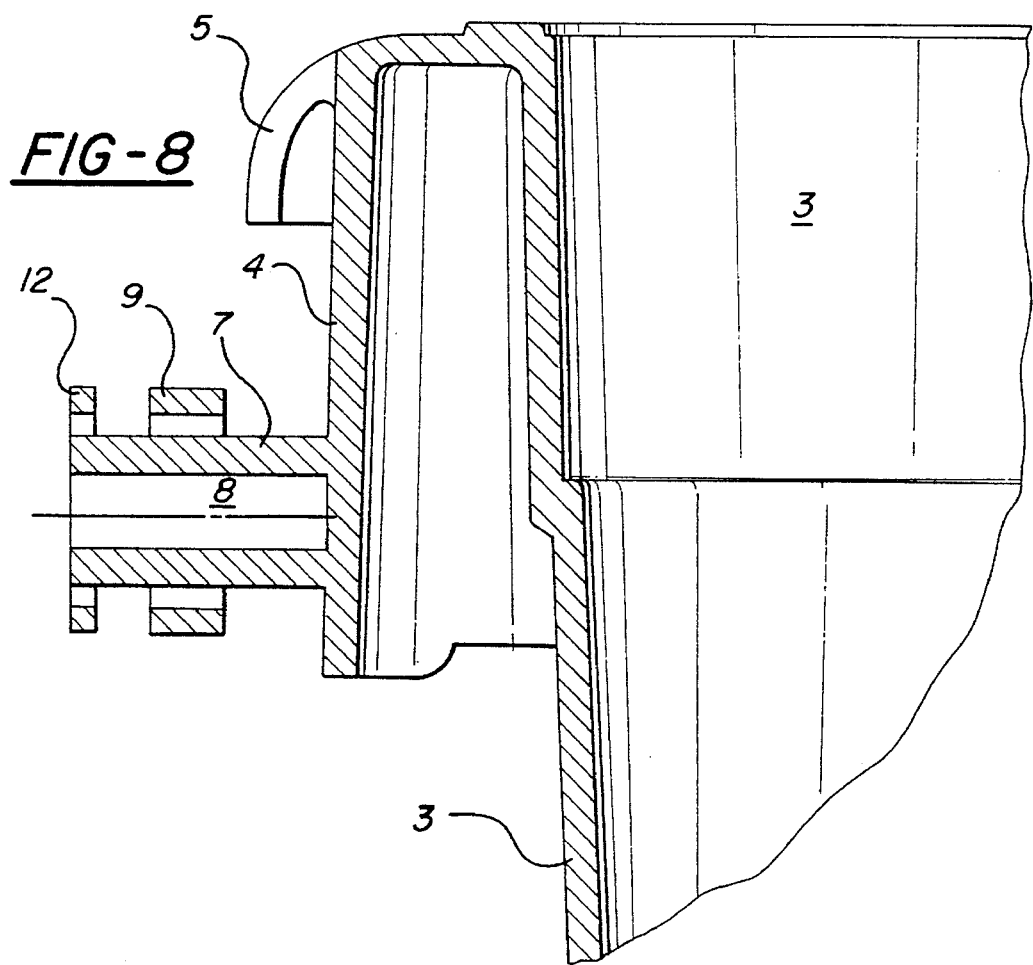

FIG. 8 illustrates a partial section of a pin arrangement of a different design of a plastic bucket 1 in accordance with the invention. In this case, the pin 7 is connected to the edge 4 in the same manner as described above.

It is apparent from this that the arrangement and design of the pin 7 is independent on the design of the edge 4. It would thus also be possible to locate the pin 7 directly on the wall 3, this being open to consideration for very inexpensive plastic buckets, in particular, where perhaps only the upper part of the wall is stiffened and designed as an edge 4 for stabilisation.

Figure 11:
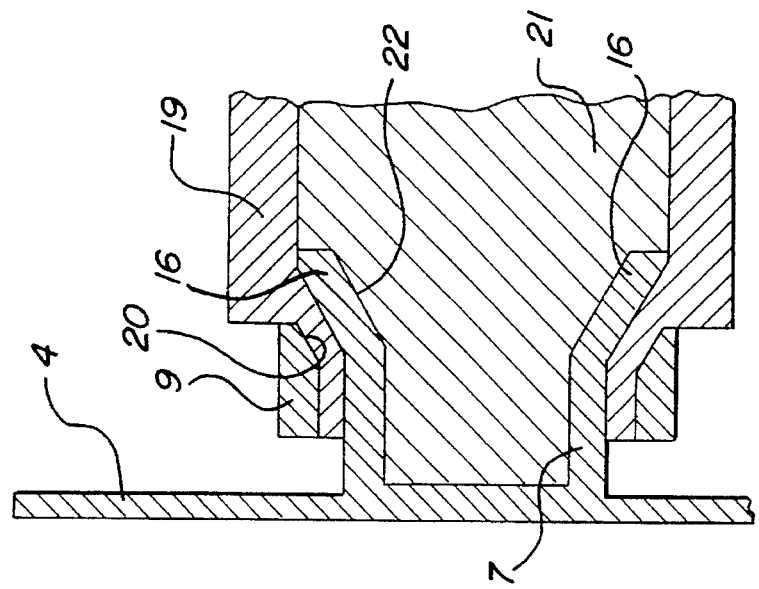
Figure 10:
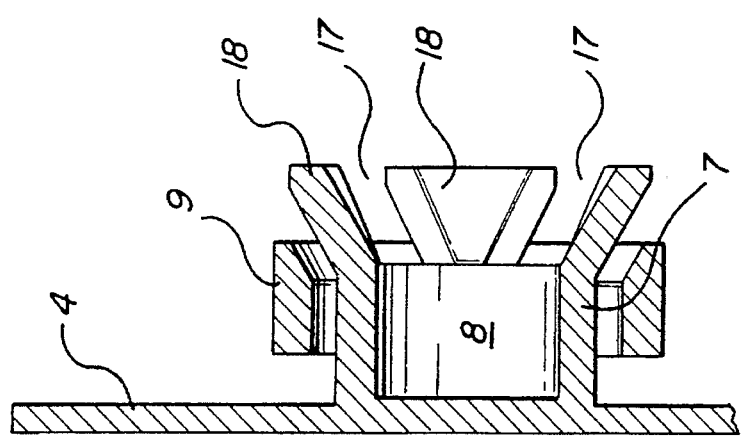
Figure 9:
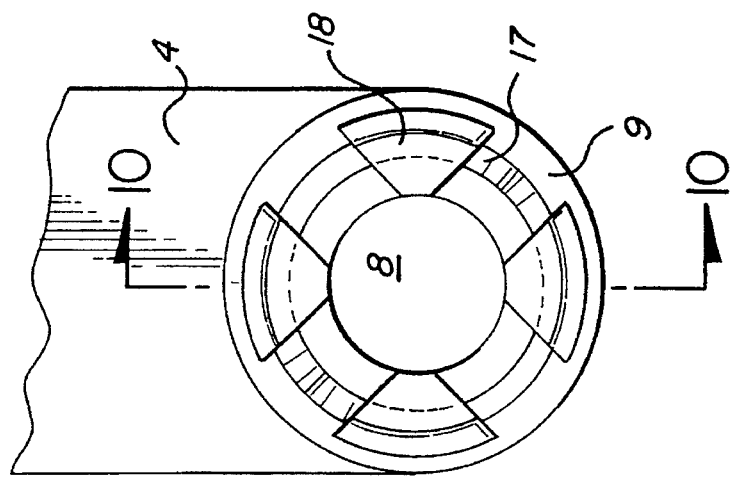

A particularly expedient design of a pin 7 and a carrying handle eye 9 is illustrated in FIGS. 9 to 11.

In this case, the pin 7 is hollow and has a conical extension 16 at the end. The pin 7 is slitted four times in the axial direction in the area of the conical extension 16. The slits 17 divide the conical extension into four cone elements 18 which, in their entirety, prevent the carrying handle eyes 6 from slipping off the pins 7.

In the manufacture of an injection-moulded plastic bucket 1, a cavity embodying the bucket shape to be manufactured is formed by a hollow mould and a female mould in the familiar manner. A solidifying plastic compound is injected into this cavity.

Once the plastic compound has hardened, the two mould halves are separated from each other in a demoulding operation. It is important in this context that the mould be designed in such a way that all moulded parts of the finished plastic bucket 1 can be removed from the mould without leaving any residues.

For this reason, the mould halves are parted along the parting line 23, as shown in FIG. 5.

However, the carrying handle eye 9 and the pin 7 have a shape which cannot be manufactured without additional means, as they could not be removed from the mould. For this reason, pin-forming sleeves protruding into the cavity of the carrying handle eyes 9 are inserted at the locations of the moulded parts embodying the carrying handle eyes 9.

A core is also inserted within the sleeve in order to form the cavity 8.

The core and the sleeve are withdrawn from the mould before the mould halves are parted, so that unimpeded demoulding is possible, even with the fully-formed pin 7 and the carrying handle eye 9.

When manufacturing a pin in accordance with FIGS. 9 and 10, a pin-forming sleeve 19 with a conical extension of its inner contour 20 is inserted which projects into the cavity of the carrying handle eye 9. The outer side of the sleeve 19 has an outer contour which forms the carrying handle eye 9.

For further formation of the cone elements 18, a core 21 is inserted which forms a cavity in conjunction with the inside of the sleeve, has a conical extension 22 located on the pin end side and is provided with slit-forming webs running in the axial direction in this area.

Once the plastic compound has hardened, the core 21 is withdrawn first, followed by the sleeve 19, utilising the elasticity of the cone elements 18.

LIST OF REFERENCE NUMBERS

1. Plastic bucket
2. Bottom
3. Wall
4. Edge
5. Snap-fitting projection
6. Carrying handle
7. Pin
8. Cavity
9. Carrying handle eye
10. Ties
11. Ties
12. Retaining ring
13. Ties
14. Tab
15. Tie
16. Conical extension
17. Slit
18. Cone element
19. Sleeve
20. Extension of the inner contour of the sleeve
21. Core
22. Conical extension of the core
23. Parting line

What is claimed is:

1. Injection-moulded plastic bucket (1) with a bottom (2), a wall (3) expanding conically from there to the upper edge (4), and with a carrying handle (6) having carrying handle eyes (9) connected to the ends of the carrying handle (6), where the upper edge (4) of the wall (3) is provided with receiving elements for the carrying handle (6) at diametrically opposite points, consisting of outward-projecting pins (7) being encircled by the carrying handle eyes (9), integrally moulded on the upper edge (4), the ends of the pins being provided with securing elements to prevent the carrying handle eyes (9) from slipping off laterally, characterized in that the retaining element is designed as a retaining ring (12), integrally moulded on the outer end of the pin (7) with at least one tie (13), and that further ties (11) between carrying handle eye (9) and pin (7) are in line with the ties (13) between retaining ring (12) and pin (7) in the axial direction of the pin (7) directly after manufacture of the plastic bucket (1) and prior to use of the carrying handle (6).

2. Injection-moulded plastic bucket as per claim 1, characterised in that the carrying handle eye (9) is connected to the pin (7) via at least one tie (11) designed as a predetermined breaking point.

3. Injection-molded plastic bucket as per claim 2, characterized in that the carrying handle (6) is connected directly to the upper edge (4) via at least one tie (10) designed as a predetermined breaking point.

4. Injection-molded plastic bucket as per claim 1, characterized in that the carrying handle (6) is designed as an original seal in such a way that it permits an opening of a lid sealing the upper side only through ties to be broken.

5. Injection-molded plastic bucket as per claim 1, characterized in that in the area of the edge (4) in which the carrying handle (6) is connected to the edge via the ties (10), a tab (14) is designed as part of the edge (4), extending outward by a small amount, being separate from the rest of the edge (4) and only connected to the edge (4) via ties (15) designed as predetermined breaking points.

6. Injection-molded plastic bucket as per claim 1, characterized in that the carrying handle (6) is connected directly to the upper edge (4) via at least one tie (10) designed as a predetermined breaking point.

7. Injection-molded plastic bucket as per claim 6, characterized in that the carrying handle (6) is designed as an original seal in such a way that it permits an opening of a lid sealing the upper side only through ties to be broken.

8. Injection-molded plastic bucket as per claim 7, characterized in that in the area of the edge (4) in which the carrying handle (6) is connected to the edge via the ties (10), a tab (14) is designed as part of the edge (4), extending outward by a small amount, being separate from the rest of the edge (4) and only connected to the edge (4) via ties (15) designed as predetermined breaking points.

9. Injection-molded plastic bucket as per claim 1, characterized in that the carrying handle (6) is designed as an original seal in such a way that it permits an opening of a lid sealing the upper side only through ties to be broken.

10. Injection-molded plastic bucket as per claim 9, characterized in that in the area of the edge (4) in which the carrying handle (6) is connected to the edge via the ties (10), a tab (14) is designed as part of the edge (4), extending outward by a small amount, being separate from the rest of the edge (4) and only connected to the edge (4) via ties (15) designed as predetermined breaking points.

* * * * *